(12) United States Patent
Lykkja

(10) Patent No.: US 12,455,387 B2
(45) Date of Patent: Oct. 28, 2025

(54) VEHICLE MOVEMENT TRACKING

(71) Applicant: Q-Free Norge AS, Trondheim (NO)

(72) Inventor: Ola Martin Lykkja, Rasta (NO)

(73) Assignee: Q-Free Norge AS, Trondheim (NO)

( * ) Notice: Subject to any disclaimer, the term of this patent is extended or adjusted under 35 U.S.C. 154(b) by 346 days.

(21) Appl. No.: 17/881,241

(22) Filed: Aug. 4, 2022

(65) Prior Publication Data
US 2023/0045632 A1  Feb. 9, 2023

(30) Foreign Application Priority Data
Aug. 4, 2021 (GB) .................................. 2111274

(51) Int. Cl.
*G07B 15/06* (2011.01)
*G01S 19/42* (2010.01)

(52) U.S. Cl.
CPC .............. *G01S 19/42* (2013.01); *G07B 15/06* (2013.01)

(58) Field of Classification Search
CPC ...... G01C 21/005; G01C 21/20; G01C 21/26; G01C 21/30; G01C 21/32; G01C 21/3667; G01C 21/34; G01C 21/3676; H04W 4/46; G01S 5/0294; G01S 19/396; G01S 19/41; G01S 19/42; G01S 19/48; G01S 5/02527; G01S 19/14; G01S 19/393; G08G 1/205; H04B 17/318
See application file for complete search history.

(56) References Cited

U.S. PATENT DOCUMENTS

| | | | | |
|---|---|---|---|---|
| 5,394,333 A | * | 2/1995 | Kao | G01S 19/40 701/472 |
| 6,331,836 B1 | * | 12/2001 | Jandrell | G01S 19/29 701/478.5 |
| 6,792,363 B1 | * | 9/2004 | Bye | G05D 1/0005 702/57 |
| 8,010,284 B2 | * | 8/2011 | Kaplan | G01C 21/26 340/988 |
| 10,854,018 B2 | * | 12/2020 | Novak | G07B 15/02 |
| 10,955,556 B2 | | 3/2021 | MacGougan et al. | |
| 2007/0244635 A1 | * | 10/2007 | Asahara | G01C 21/3453 701/416 |
| 2008/0125963 A1 | | 5/2008 | Shimizu | |
| 2008/0262730 A1 | * | 10/2008 | Onome | G01C 21/28 701/500 |

(Continued)

FOREIGN PATENT DOCUMENTS

| | | |
|---|---|---|
| CN | 106033122 A | 10/2016 |
| EP | 2 924 662 B1 | 8/2016 |

(Continued)

OTHER PUBLICATIONS

Extended European Search Report for European Application No. 22188879.5, mailed Dec. 13, 2022, 11 pages.

*Primary Examiner* — Dino Kujundzic
(74) *Attorney, Agent, or Firm* — Klarquist Sparkman, LLP (57) ABSTRACT

A method and system for determining a path taken by a vehicle are disclosed. A path portion is determined from a plurality of position estimates of the vehicle using a satellite positioning system. From the position estimates a determination is made that the path includes a poor satellite signal zone and the path portion is combined with a predetermined path portion corresponding to the poor satellite signal zone to provide the determined path.

15 Claims, 4 Drawing Sheets

(56) References Cited

U.S. PATENT DOCUMENTS

| | | | |
|---|---|---|---|
| 2009/0157566 A1 | 6/2009 | Grush | |
| 2010/0088025 A1* | 4/2010 | Garg | G01C 21/3461 |
| | | | 701/533 |
| 2011/0307171 A1* | 12/2011 | Waite | G01C 21/30 |
| | | | 701/421 |
| 2013/0162466 A1* | 6/2013 | Mcdanell | H04B 7/18517 |
| | | | 342/352 |
| 2014/0278838 A1 | 9/2014 | Novak | |
| 2016/0280401 A1* | 9/2016 | Driscoll | G01S 5/011 |
| 2016/0282473 A1* | 9/2016 | Driscoll | G01S 19/396 |
| 2017/0215166 A1* | 7/2017 | Disatnik | G01S 5/0295 |
| 2017/0272972 A1* | 9/2017 | Egner | H04L 47/2441 |
| 2017/0299724 A1* | 10/2017 | Hsu | G01S 19/05 |
| 2018/0023968 A1* | 1/2018 | Stuchfield | G01C 21/3453 |
| | | | 701/416 |
| 2018/0315313 A1* | 11/2018 | Klochikhin | G08G 1/146 |
| 2019/0041227 A1* | 2/2019 | Shetty | G05D 1/0285 |
| 2019/0113630 A1* | 4/2019 | Hermann | G01S 19/08 |
| 2019/0302220 A1* | 10/2019 | Kumar | H04W 4/44 |
| 2020/0158518 A1* | 5/2020 | Kim | G01C 21/16 |
| 2020/0193170 A1* | 6/2020 | Braybrook | G06T 7/32 |
| 2021/0239848 A1* | 8/2021 | Karvounis | G01S 19/243 |
| 2022/0011448 A1* | 1/2022 | Xu | G01S 19/47 |
| 2022/0196425 A1* | 6/2022 | Xu | H04W 24/08 |

FOREIGN PATENT DOCUMENTS

| | | |
|---|---|---|
| EP | 3 279 870 A1 | 2/2018 |
| EP | 2 955 546 B1 | 7/2019 |

\* cited by examiner

VEHICLE MOVEMENT TRACKING

CROSS-REFERENCE TO RELATED APPLICATION

This application claims priority from Great Britain Application No. 2111274.3, filed Aug. 4, 2021, which application is incorporated herein by reference in its entirety.

This application relates to tracking movement, e.g. the distance and/or path travelled by vehicle.

The use of satellites, in particular the Global Navigation Satellite System, to provide geo-spatial positioning information is well-known in the art. In the automotive field, GNSS may be used, along with other sensors such as accelerometers, gyroscopes, speed sensors etc., to determine the location of a moving vehicle to aid navigation or tracking of the position of the vehicle. In applications such as distance-based tolling, accurate tracking of the position of a vehicle over time is important to ensure accurate tolling charges. Typically, a receiver is provided in the vehicle to receive signals from the satellites and keeps a log of the vehicle's movements in order to calculate where the vehicle travelled and when in order to levy the correct charges. This may be necessary because under some toll schemes, the charges may vary based on the category or location of the road, or the time of day on which it is used.

However, the use of satellites to provide geo-spatial positioning information has associated limitations. The determined position of a vehicle can become less reliable in areas in which signals from the satellites are not reliably received. For example, when a vehicle passes through a tunnel, the signals transmitted from the satellites may be unable to penetrate the tunnel and the receiver in a vehicle may not receive these signals. Therefore, the position of the vehicle in the tunnel either cannot be determined at all if the position determination is solely dependent on the satellite signal, or cannot be determined as accurately as such determination must be dependent on other sensors which tend to give larger errors over time. This can lead to inaccuracies in the recorded path travelled by the vehicle and the distance travelled by the vehicle. When used in tolling applications, this can lead to inaccurate tolling charges.

When viewed from a first aspect, the present invention provides a method of determining a path taken by a vehicle, comprising:
  determining a path portion from a plurality of position estimates of the vehicle using a satellite positioning system;
  determining from the position estimates that the path includes a poor satellite signal zone;
  combining the path portion with a predetermined path portion corresponding to the poor satellite signal zone to provide the determined path.

When viewed from a second aspect, the present invention provides a system for determining a path taken by a vehicle, comprising:
  a receiver for receiving satellite signals from a satellite positioning system; and
  one or more processors arranged to:
    determine a path portion from a plurality of position estimates of the vehicle using said satellite signals;
    determine from the position estimates that the path includes a poor satellite signal zone; and
    combine the path portion with a predetermined path portion corresponding to the poor satellite signal zone to provide the determined path.

Thus it will be seen by those skilled in the art that the invention may enable more accurate monitoring of the path taken by a vehicle, as poor satellite signal zones in which the position of the vehicle cannot be determined or accurately determined are accounted for. By more accurately determining the path taken by the vehicle, the overall distances it has travelled can be more accurately determined for example. In applications in which the path taken and/or distance travelled is used for tolling purposes, this enables more accurate tolling.

The satellite positioning system may be any suitable satellite positioning system, e.g. a Global Navigation Satellite System (GNSS) such as the Global Positioning System (GPS), GLONASS, Galileo or Beidou. The position estimates are typically determined from signals received from the satellite positioning system in the well-known manner. Preferably the position estimates comprise longitude and latitude co-ordinates (i.e. they are two dimensional position estimates. They could also comprise an altitude co-ordinate.

In a set of embodiments, the position estimates are determined on the vehicle from the signals received from satellites in the satellite positioning system. For example the vehicle may comprise a suitable data processing module. This is not essential however. The received signals could be stored and used for later calculation by another system.

In a set of embodiments each position estimate is associated with a time-stamp. This facilitates establishing the time at which the vehicle was at a given position which may be useful in systems e.g. in toll systems in which charges are time-dependent. The time-stamp may be provided by a signal from the positioning satellites, another external clock or from a clock on the vehicle.

The position estimates may be used in any suitable manner to determine the path portion. For example, the path portion may be determined using curve fitting of the position estimates. The path portion may be determined based on position estimates in relation to a map of the area (e.g. one relating to road systems). The path portion may be determined by a suitable processor on the vehicle or by a processor in a remote system. In either case the path portion could be determined in real time using only the information available at the time (a priori information) or at a later time using such information in combination with subsequently determined (a posteriori) information.

In a set of embodiments, the vehicle transmits data to a remote system—i.e. comprises a transmitter. Such transmitter and the receiver for receiving the satellite signals may be integrated into a single transceiver. The vehicle could transmit data comprising determined position estimates and/or path portions to the remote system. The data may be transmitted effectively immediately or as soon as possible e.g. once the poor satellite signal zone has been exited), in bursts or in response to specific event such as polling by a roadside beacon, at the end of a journey etc. Typically the data would include identification information such as a unique identification number or a license plate number associated with the vehicle. This enables association of the data with the vehicle.

In some embodiments, the vehicle comprises a processing system, receiver for receiving satellite signals and optionally the transmitter as part of an on board unit (OBU).

A poor satellite signal zone is typically an area or region in which GNSS position estimates are either inaccurate or where position estimates cannot be determined. Inaccurate position measurement may be position estimates with an associated error which exceeds a predetermined threshold. Typically, poor satellite signal zones correspond to regions in which signals from some or all of the required satellites are too weak or noisy for reliable use. For example, in a poor satellite signal zone the vehicle may not receive signals from a sufficient number of satellites to make position estimates accurately or at all. Poor satellite signal zones may include tunnels, valleys and manmade infrastructure (e.g. dense distributions of high rise buildings).

A poor satellite signal zone may be determined in any suitable manner. In a set of embodiments, a poor satellite signal zone is determined by the vehicle itself—e.g. by a processing system provided thereon or by the previously mentioned processing system. In such embodiments determinations of poor satellite signal zones may be included in data transmitted to the remote system where appropriate. Additionally or alternatively, the remote system may be arranged to determine a poor satellite signal zone.

In a set of embodiments determining that a path includes a poor satellite signal zone comprises determining that the path includes a predetermined location of the poor satellite signal zone based on the position estimates. Such predetermined locations may be stored in a database, map or the like.

The predetermined path portion corresponding to a poor satellite signal zone may be identified in any suitable manner. Preferably the predetermined location of the poor satellite signal zone is used to identify a corresponding predetermined path portion in a database. In a set of embodiments, position estimates of the vehicle and/or the path portion may be used to determine an appropriate predetermined path portion. For example, the position estimates of the vehicle before entry to and/or exit from a poor satellite signal zone may be used to determine the appropriate predetermined path portion.

A poor satellite signal zone could be determined empirically. Such empirical determinations could, for example, be based on an absence of satellite signals, or sufficient satellite signals or on signal strength, signal to noise ratio, error rate or any other suitable metric pertaining to the signals themselves. Additionally or alternatively such determinations could, for example, be based on establishing an error on the positioning estimates and comparing the error to a threshold. For example, if the associated error exceeds 10 metres, the position estimate may be considered to be inaccurate or erroneous. One or more inaccurate or erroneous position estimates may indicate a poor satellite signal zone.

In embodiments in which the position estimates comprise latitude, longitude and/or altitude co-ordinates, associated errors may be calculated for each of these co-ordinates or an aggregated error could be used.

Empirical determinations of poor satellite signal zones could be used, for example, to decide whether or not to combine a predetermined path portion corresponding to the poor satellite signal zone to provide the determined path. This might be useful in areas in which the data coverage is marginal but may sometimes be reliable. Equally the empirical determinations could be used to decide where the beginning and/or end should be of the predetermined path portion that is combined with the position estimates. In particular, the last reliable position estimate of the vehicle before the poor satellite signal zone may indicate the start of the poor satellite signal zone and the first reliable position estimate of the vehicle after the poor satellite signal zone may indicate the end of the poor satellite signal zone. In examples in which the poor satellite signal zone is a tunnel, the start of the poor satellite signal zone may be an entrance of a tunnel and the end of the poor satellite signal zone may be an exit of the tunnel.

Where empirical determinations of poor satellite signal zones are made it is possible that they will be determined where no corresponding predetermined path portions exist. In such situations, a different approach would be required—e.g. an error could simply be flagged, or other techniques used to establish a path portion such as a more basic interpolation, use of historical data from other users etc. The latter may be feasible as such poor satellite signal zones may be unexpected and potentially therefore transient.

A predetermined path portion corresponding to a poor satellite signal zone may be determined in any suitable manner. In a set of embodiments, predetermined path portions corresponding to one or more poor satellite signal zones are stored in a database. The database may be held in a memory in the vehicle and/or in a remote system.

Preferably the predetermined path portion reflects the geometry of a path through a poor satellite signal zone reasonably accurately. In a set of embodiments, the predetermined path portion comprises a series of predetermined positions. Preferably, the predetermined positions comprise latitude and longitude co-ordinates. The predetermined positions may also comprise altitude co-ordinates. The predetermined path portion may be determined using curve fitting or interpolation of the predetermined positions.

The predetermined path portions may be determined by surveying a poor satellite signal zone. For example, the predetermined path portions may be determined using map data, topography data, civil engineering data etc. In a set of embodiments, the predetermined part portions are determined by sending a survey vehicle through a poor satellite signal zone. The survey vehicle preferably comprises equipment which facilitates the position of the vehicle to be determined without requiring signals to be received from the satellite positioning system. For example, the survey vehicle may comprise a high precision gyroscope, accelerometer and/or tachometer.

It will be appreciated by the skilled person that there may be multiple routes through a poor satellite signal zone. For example, in embodiments in which a poor satellite signal zone is a tunnel or densely built area, there may be multiple entrances to the tunnel or area and/or multiple exits therefrom and thus different routes that a vehicle may take. Therefore, in a set of embodiments, at least one poor satellite signal zone is associated with two or more predetermined path portions. In such examples, determining the start of the poor satellite signal zone (e.g. entrance) and the end of the poor satellite signal zone (e.g. exit) passed through by the vehicle may be used to infer the actual path taken and thus the appropriate corresponding predetermined path portion.

The position estimates and the predetermined path portion may be combined in any suitable manner to provide the determined path. For example, the predetermined path portion may be inserted into the path portion to form the determined path. Preferably the determined path is continuous. In a set of embodiments, the determined path is provided by applying an algorithm to align the path portion and the predetermined path portion. Preferably the algorithm is a curve-matching algorithm. By applying an algorithm to align the predetermined path portion with the path portion, the accuracy of the determined path may be improved.

Position estimates which are obtained from the poor satellite signal zone could be used in conjunction with the predetermined path portion. In some embodiments however, position estimates in the poor satellite signal zones and/or position estimates with associated errors exceeding a predetermined threshold are simply removed from the path portion or disregarded. The threshold may be the same predetermined threshold used to determine the start or end of a poor satellite signal zone according to some embodiments. These removed position estimates are preferably replaced by the predetermined path portion. This may help to avoid erroneous position estimates forming part of the determined path and affecting the accuracy of the determined path. It will be appreciated that by applying a threshold to the measurement error, the exact point at which the beginning and end of a predetermined path portion is spliced into the determined path may depend on conditions. To give a typical example, where the poor satellite signal zone is a tunnel, the predetermined path may extend beyond the end of the tunnel as it will take some time for satellite signal reception to be re-established and for on-board position determination algorithms (e.g. based on a Kalman filter using signals from various sensors) to incorporate the newly available satellite signals and so reduce position determination error.

It will also be appreciated by those skilled in the art that multiple path portions and/or multiple predetermined path portions may be combined to provide the determined path. This may be advantageous in regions in which there are multiple poor satellite signal zones, for example mountainous regions where there may be several tunnels.

In a set of embodiments, the distance travelled by the vehicle is calculated from the determined path.

It will be appreciated that the method and/or system according to aspects of the present invention may be used in multiple applications. In a set of embodiments, the method further comprises calculating a toll charge for the vehicle based on the determined path taken by the vehicle. The determined distance travelled by the vehicle may be used to calculate an appropriate toll charge for the vehicle.

The toll may be calculated based on different regions that the determined path passes through. For example, regions with high pollution levels may be associated with a higher toll rate than regions with lower pollution levels. For examples, inner city regions may be associated with high toll rate than the outskirts of a city. The toll may also be calculated based on the roads along which the determined path passes. Specific roads used by the vehicle may be associated with a specific toll.

The toll may be calculated based on the time of day. For example, peak hours may be associated with a higher toll rate than off-peak hours. The pricing scheme may be different on weekdays and weekends and holidays.

The toll calculations may be performed by any suitable means. In a set of embodiments, the toll calculations are performed by a payment system. The payment system may be a subsystem of the above-mentioned remote system for determining the path of the vehicle, or may be an independent system.

Preferably, the payment system receives information on the determined path and/or the length of the determined path, and information on the identification information of the vehicle which travelled along the determined path. In embodiments in which the length of the determined path is not calculated beforehand, the payment system may be arranged to calculate the length of the determined path. Preferably, the payment system comprises a database comprising information on toll rates. In a set of embodiments, the payment system is configured to calculate the toll for a determined path and/or length of the determined path.

In a set of embodiments where the predetermined path portion comprises a plurality of predetermined positions, the predetermined positions are adjusted by accounting for the speed of the vehicle. This is particularly beneficial in applications in which the toll rate varies depending on the time of day. For example, time stamps can be applied to each predetermined position taking into account the speed of the vehicle. The speed of the vehicle may for example be determined using sensors on the vehicle—e.g. the vehicle's speedometer or an independent accelerometer. In such embodiments, the speed of the vehicle may be part of the data transmitted to a remote system. Certain embodiments of the present invention will now be described, by way of example only, with reference to the accompanying drawings in which:

Figure 1:
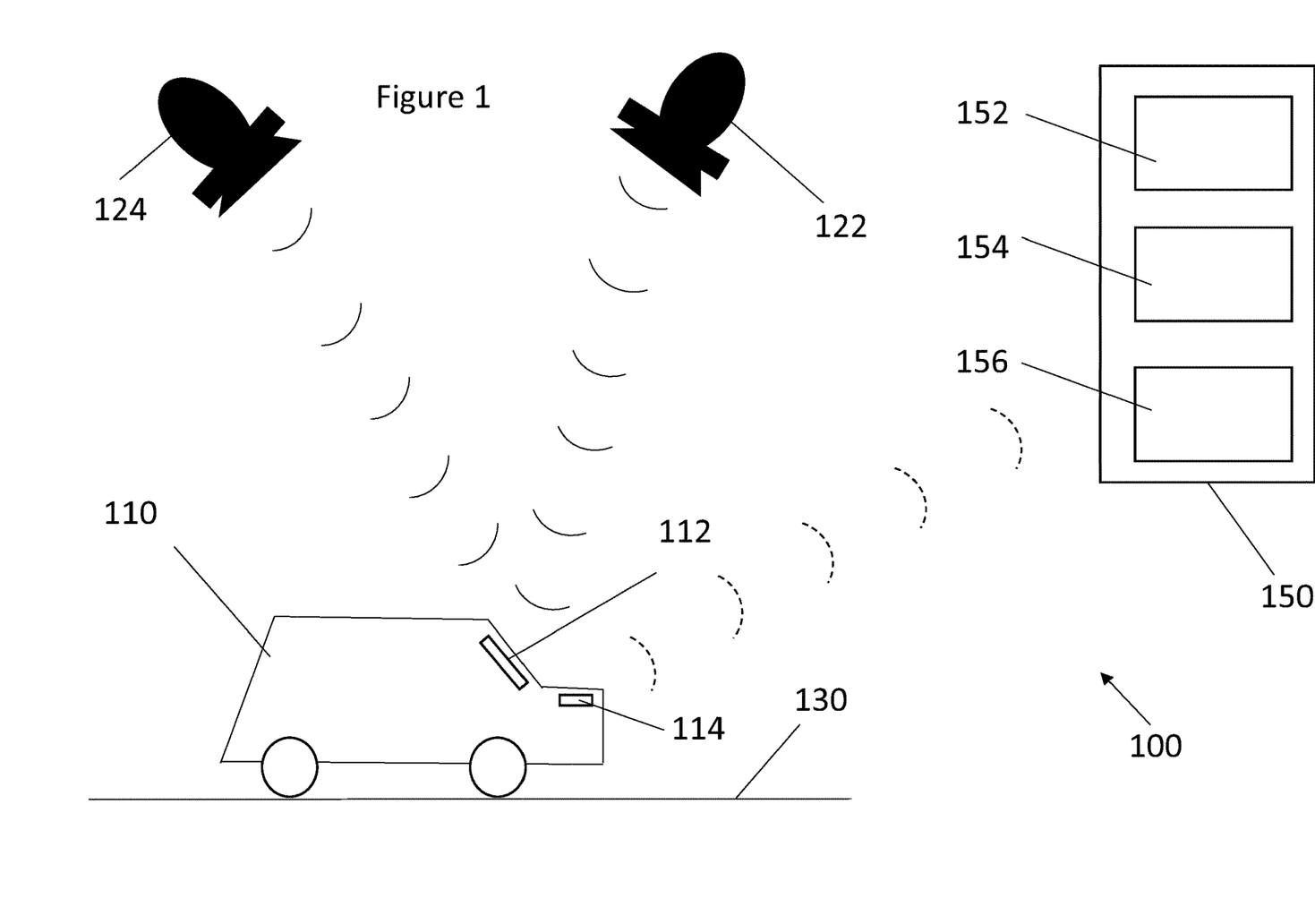
FIG. 1 shows schematically elements of a vehicle tolling system.

FIG. 1 is a schematic diagram showing elements of a system 100 for distance-based tolling, i.e. for levying a charge based on the distance travelled by a vehicle. It will be appreciated that the system 100 could also be used for charging based on other variables, e.g. the regions through which a vehicle travels. The system 100 includes an exemplary vehicle 110 travelling along a road 130.

The system 100 also includes exemplary satellites 122, 124 which may be part of a Global Navigation Satellite System (GNSS). For simplicity, only two satellites are shown however, but typically such positioning systems require at least three satellites which are able to transmit signals to the vehicle at any given time.

The vehicle 110 comprises a receiver 112 configured to receive signals from the satellites 122, 124. The vehicle may also have other sensors (not shown) such as an accelerometer, gyroscope etc. to provide additional information. The signals form the satellites and other sensors enable a processor (not shown) in the vehicle 110 to determine the position of the vehicle 110 e.g. using a suitable algorithm based on a Kalman filter in a manner known per se to those skilled in the art. The vehicle 110 also includes a transmitter 114. The receiver 112 and the transmitter 114 may be incorporated into the same system within the vehicle 110, or may form parts of separate systems. The receiver 112 and the transmitter 114 may be combined into a single transceiver.

The system 100 also includes a remote subsystem 150. Parts of the remote subsystem 150 are remote from the vehicle 110 and the road 130 although in this example it includes a receiver to receive signals transmitted by the transmitter 114. This could be a cellular data network base station, other satellites etc. The signals transmitted from the vehicle 110 comprise data regarding the position and identity of the vehicle 110.

The remote subsystem 150 includes a memory 152 and a processor 154. The memory 152 comprises information for a plurality of poor satellite signal zones. Poor satellite signal zones are regions in which limited, or no signals are received by a vehicle 110 from one or more of the satellites 122, 124. For example, a tunnel or a valley may be a poor satellite signal zone.

The remote subsystem 150 also includes a payment system 156. The payment system 156 handles the tolling of a vehicle 110 based on a determined path, for example by debiting an account associated with a license plate number and/or a unique identification code of a vehicle 110. Calculation of the determined path will be described in greater detail below.

Figure 2A:
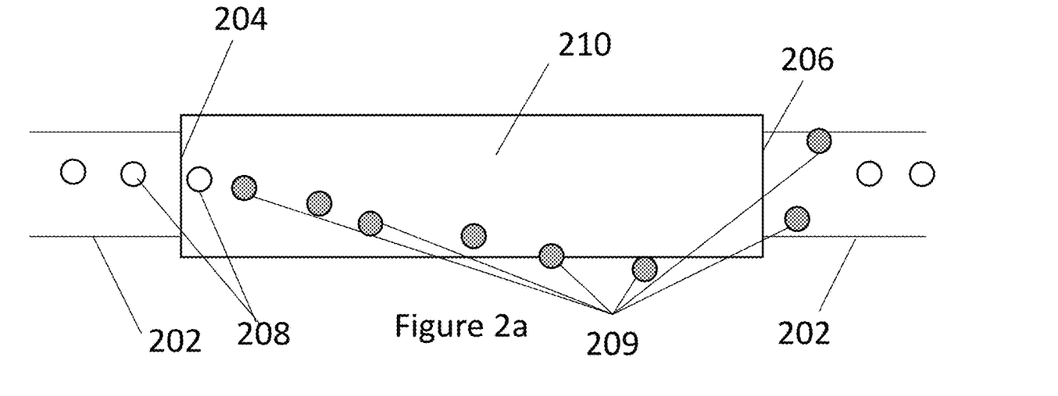
FIGS. 2a, 2b and 2c illustrate how a path followed by a vehicle is determined when a vehicle travels through a poor satellite signal zone in accordance with the present invention.
Figure 2B:
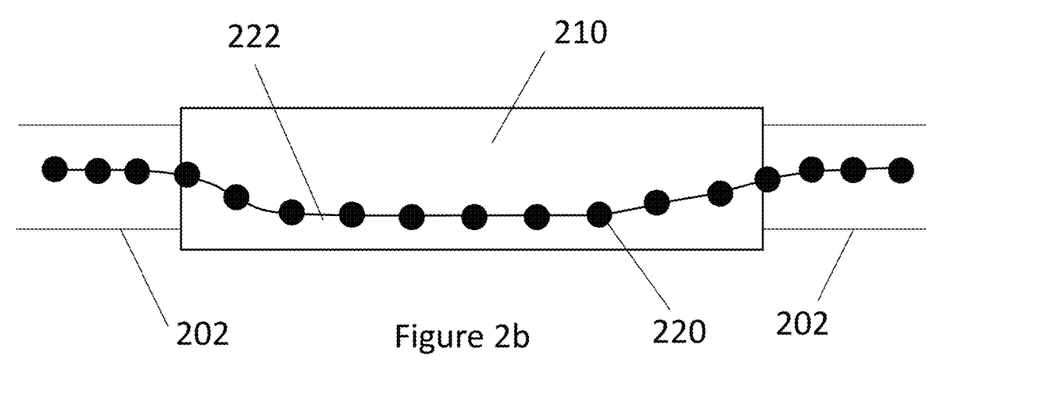
Figure 2C:
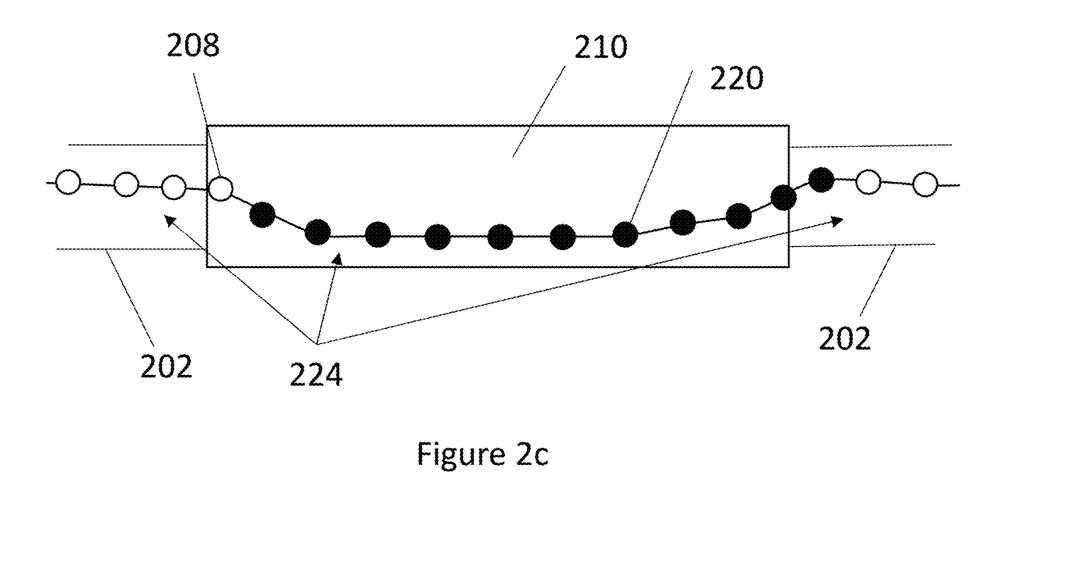

FIGS. 2a, 2b and 2c demonstrate how the path followed by a vehicle is determined when a vehicle travels along road 202 through a poor satellite signal zone such as a tunnel 210.

FIG. 2a shows position estimates 208 determined by a processor in the vehicle 110 as the vehicle travels along the road 202 based on a Kalman filter calculation using, amongst other things, signals received from navigation satellites 122, 124 (FIG. 1). However shortly after the vehicle enters the tunnel 210, so that the satellite signals are no longer received, no sufficiently accurate position estimates can be determined.

As seen in FIG. 2a, an accurate position estimate 208 may be provided just after the vehicle has passed through the tunnel entrance 204. Thereafter however, position estimates 209 determined inside the tunnel 210 have a significant drift and those near the exit 206 of the tunnel 210 have random large errors associated with them, and are therefore considered to be inaccurate. This could be determined by calculating an error margin and comparing to a threshold, examining a deviation from the previous path, considering the received signal strength of the satellite signals etc. It is desirable for these inaccurate position estimates 209 to be accounted for. It will be noted that the inaccurate estimates 209 extend beyond the end of the tunnel 206 since even when the satellite signals are available to be received again, there is a finite period of time (e.g. of the order of 3 seconds) required to process them and update the Kalman filter.

FIG. 2b demonstrates a predetermined path 222 through the tunnel 210. This may be determined in a number of ways. For example, a survey vehicle may have previously been sent through the tunnel 210 to determine the path which would be taken by a vehicle through the tunnel 210. The survey vehicle determines the path through the tunnel 210 without relying on signals from satellites 122, 124. For example, the survey vehicle may include an on-board unit with highly accurate accelerometers, gyroscopes, speed sensors etc. which is capable of determining the path travelled by the vehicle. In another example, the tunnel 210 may be manually surveyed in order to determine the path a vehicle 110 takes through the tunnel 210, or cartography or civil engineering data may be used.

The predetermined path 222 is formed from a number of predetermined positions 220. The predetermined positions 220 correspond to specific latitude and longitude co-ordinates making up the predetermined path 222 through the tunnel 210 and extending a little way beyond the entrance 204 and exit 206. These predetermined positions 220 could e.g. be obtained by the survey vehicle as described above. The process can be generalised into three spatial dimensions by taking altitude into account.

FIG. 2c demonstrates how the overall path taken by the vehicle 110 is determined. A processor, for example in the remote subsystem 150, combines the path portions determined from the 'good' position estimates 208 with the predetermined path portion 222 corresponding to the tunnel 210. This provides the overall path 224 taken by the vehicle 110. There is no fixed transition point between the last 'good' position estimates 208 calculated using the vehicle's GNSS coordinates and the predetermined path 222. The transition will be dependent for example on when an accumulated error indicator, such as an average lateral offset over a driving distance of 100 meters for example, exceeds a threshold which will typically be different for each vehicle and may depend, for example, on GNSS constellation geometry.

Since GNSS systems typically estimate latitude/longitude positions at a fixed rate (e.g. every second or tenth of a second), the distance between the estimates 208, 209 will this thus depend on driving speed, traffic jams etc. This is why it better to look at the accumulated error over a distance In many cases, driving speed will often not vary very much over, say, 100 meters and the speed from the last 'good' estimate 208 may be used.

Figure 3:
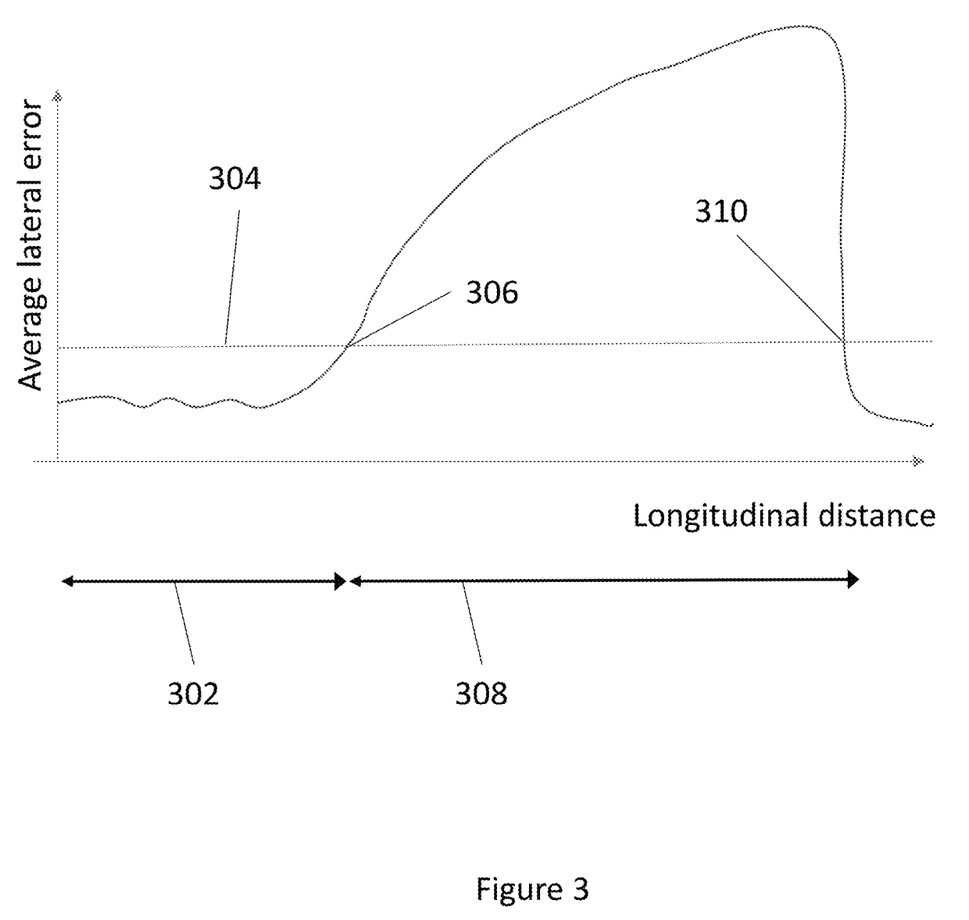
FIG. 3 is a typical graph of accumulated position error against distance for a vehicle travelling through a tunnel.

An example of this approach is shown in FIG. 3. This shows an exemplary graph of average lateral error against longitudinal distance. In a first phase 302, corresponding to the vehicle travelling towards the tunnel 210, the average error is below a threshold 304. At point 306, the average error crosses the threshold 304 so the estimates 208 are replaced by the predetermined path portion 222 which covers a second phase 308 in which the average error remains above the threshold 304. Finally at point 310, when the vehicle has passed a short way beyond the exit 206 of the tunnel, the average error drops below the threshold 304 and so the position estimates 208 based on the satellite signals can be sued once more.

Many types of error functions can be applied e.g. maximum error, average squared error, average error etc. and may be calculated over any convenient distance range—e.g. over a 50-100 metre sliding window.

Based on the overall path 224, the total distance travelled by the vehicle 110 can be calculated by calculating the length of the overall path 224. In distance-based tolling applications the length of the overall path 224 can be used to determine an appropriate toll charge for the vehicle 110. Toll rates based on distance may also be stored in the memory 152 of the remote subsystem 150, or in a separate memory, for example in the payment system 156.

Alternatively the time at which the vehicle is at each of the predetermined positions 220 can be estimated—i.e. a time stamp associated with each. This could be used to calculate an accurate toll charge where the toll rate changes for part of the tunnel 210 (or any other poor satellite signal zone such as a central city area with lots of tall buildings) at different parts of the day—such as when there is a transition between a peak toll rate during rush hour and an off-peak toll rate or vice versa. This time information may be derived from speed data provided by the vehicle to the remote subsystem.

In FIGS. 2b and 2c, the predetermined path is shown as being formed of a plurality of predetermined positions of a vehicle within the tunnel 210. The predetermined path could simply comprise the length of the path through the tunnel 210, however this is currently less preferred as it would be necessary to determine precise geographic locations for the end and beginning of the parts of the path determined using the satellite signals, which may be difficult to do.

Figure 4:
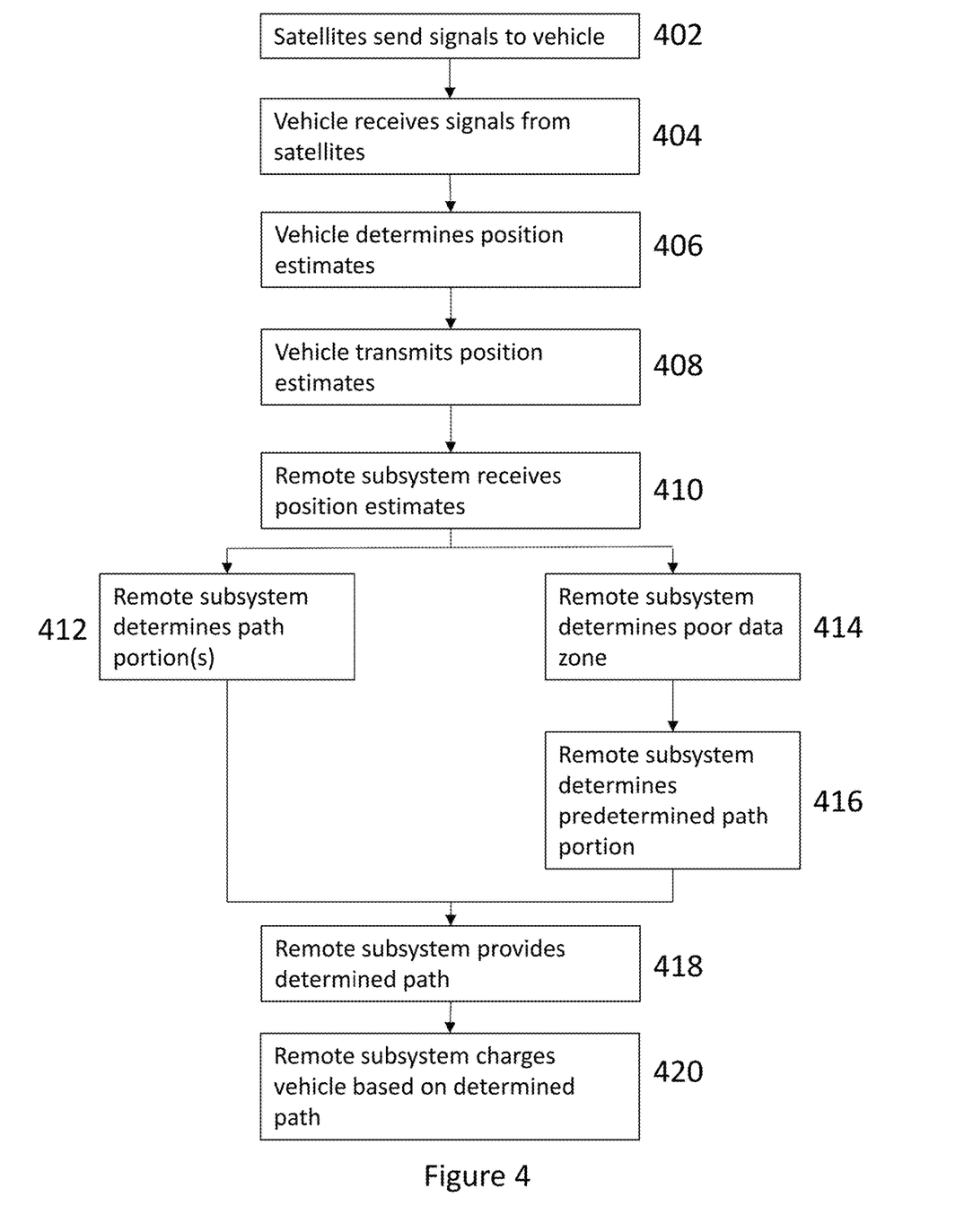
FIG. 4 is a flow diagram of a method of levying a toll charge based on path travelled by a vehicle.

FIG. 4 is a flow chart demonstrating a method for calculating a toll to be applied to a vehicle 110 based on the distance travelled. The method shown in FIG. 4 may be implemented using the system 100 described in FIG. 1 and is thus described with additional reference to FIG. 1, although it will be appreciated by the skilled person that the method may also be performed by any suitable embodiments of the system encompassed by the present invention.

It is assumed that the vehicle 110 is moving along an open road 130. In step 402, satellites 122, 124 send signals to the vehicle 110 at regular intervals. In step 404, the vehicle 110 receives signals from the satellites 122, 124. In step 406, a processor (not shown) in the vehicle 110 uses the signals from the satellites 122, 124 to estimate its position, e.g. using trilateration and provides this as an input to a Kalman filter which also uses signals from other on-board sensors as described above.

If the vehicle does not receive signals from the satellites 122, 124 then the vehicle cannot determine its position accurately enough.

In step 408, the vehicle 110 transmits its position estimate(s) to the remote subsystem 150 via its transmitter 114. The vehicle 110 may transmit the estimated position to the remote subsystem 150 every time an estimated position is determined by the processor. Alternatively, the vehicle 110 may transmit a plurality of estimated positions to the remote subsystem 150 at regular intervals or at the end of each journey (e.g. when the vehicle comes to a stop). The vehicle 110 also transmits identification information to the remote subsystem 150 via the transmitter 114. The identification information may be a unique identification number or a license plate number. This identification information is transmitted by the vehicle 110 to the remote subsystem 150 alongside each estimated position/plurality of estimated positions. If the vehicle 110 has not determined an estimated position, e.g. because it has not received signals from the satellites 122, 124, then the vehicle 110 either transmits a signal to the remote subsystem 150 indicating no estimated position could be determined, or the vehicle 110 may simply transmit no signal.

In step 410, the remote subsystem 150 receives the signal from the vehicle 110. If the remote subsystem 150 receives no signal from the vehicle 110, the remote subsystem 150 may recognise the absence of a signal to indicate that no estimated position(s) could be determined by the vehicle 110.

In step 412, the remote subsystem 150 determines the path portion—that is where the vehicle has travelled based on the satellite position estimates. The path portion may be continuously determined (e.g. recalculated) as signals are received from the vehicle 110, or may be calculated once the vehicle has stopped moving (e.g. after a vehicle has reached its final destination).

In step 414, the remote subsystem 150 determines that the path of the vehicle includes a poor satellite signal zone. In some instances, there may be multiple poor satellite signal zones that the vehicle 110 travels through. For example, the vehicle 110 may be travelling along a road in a mountainous region which passes through a plurality of tunnels. In this situation, the remote subsystem 150 determines multiple poor satellite signal zones based on the determined path portions.

The remote subsystem 150 may determine a poor satellite signal zone by determining that there is at least one missing position estimate. This could be determined by the remote subsystem 150 recognising the absence of a signal from the vehicle 110 or receiving a signal from the vehicle 110 indicating no estimated position could be determined. Alternatively it may simply be able to determine this from the known location of the tunnel and the fact that the vehicle was travelling towards it.

After determining the vehicle 110 has passed through a poor satellite signal zone, the remote subsystem 150 determines a predetermined path portion in step 416. The memory 152 comprises information on known poor satellite signal zones, for example the route taken by a vehicle through the poor satellite signal zone. To identify whether the determined poor satellite signal zone corresponds to a poor satellite signal zone stored in the memory 152, the remote subsystem 150 determines whether the location of the determined poor satellite signal zone corresponds to that of a known poor satellite signal zone stored in the memory 152. This may be achieved by comparing the estimated start and end of the determined poor satellite signal zone with the known starting point and end point of the poor satellite signal zones stored in the memory 152. If there is a match, the known poor satellite signal zone path is determined to be the predetermined path portion. Alternatively the accumulated error shown in FIG. 3 could be continuously monitored.

In step 418, the remote subsystem provides the determined path from memory. The determined path is provided by combining the path portion(s) and the predetermined path portion(s). The path portion(s) and the predetermined path portion(s) may be combined as described in relation to FIGS. 2a to 2c and FIG. 3.

In step 420, the remote subsystem calculates a charges to be levied on the vehicle 110 based on the determined path. The payment system 156 of the remote subsystem 150 receives information on the determined path alongside vehicle identification information. The payment system 156 uses the determined path to determine the amount to debit an account associated with the identifying information of the vehicles 110. The payment system 156 may determine an appropriate amount to debit a vehicle 110 based on the length of the determined path and/or regions which the determined path passes through. For example, the debit amount may increase linearly with the length of the determined path and additional charges may be incurred if the determined path passes through an area of high air pollution (e.g. the centre of a city) or a particular tunnel which has a specific toll associated with it. Many cities employ various access control schemes to limit traffic volume in city centres, this can be emission or noise control, access limited to local residents etc. Such schemes are often combined with distance based fees and time limitations.

Although the embodiment described above with reference to FIG. 4 transmits data to a remote subsystem to determine the path travelled, this is not essential. In other embodiments the determination may be carried out on the vehicle itself using a suitable processor. Although this requires the vehicle to have access to the database of predetermined paths, the Applicant recognises that this may comprise relatively little data compared to standard map data. In such embodiments the determined path could be transmitted to a remote toll system to determine and levy the correct charges, or even this could be calculated locally—e.g. by having the toll rates periodically downloaded to an on-board unit.

Thus it will be appreciated by those skilled in the art that the specific embodiments of the inventive concepts described herein provide a system and a method for determining the path taken by a vehicle, which may for example be used in distance-based tolling applications. It will be appreciated that many variations of the specific arrangements described here are possible within the scope of the invention. For example, whilst embodiments have been described in which the path taken by a vehicle is used to calculate the total distance travelled by the vehicle, in other embodiments the path taken may be used for other purposes such as activity monitoring or navigation.

Whilst FIGS. 1 to 4 describe the application of the method and system to a vehicle travelling through a tunnel, it will be appreciated that there are other types of poor satellite signal zones such as valleys, densely built up areas, etc.

The information regarding each poor satellite signal zone includes the path through the poor satellite signal zone. The path through the data zone is preferably recorded in the memory as an ordered sequence of latitude and longitude co-ordinates. The co-ordinates may also include an altitude measurement. These sets of co-ordinates defining the path through the poor satellite signal zone may be obtained by recording the path through the poor satellite signal zone using a survey vehicle which can determined the path without relying on satellite communications. The information regarding each poor satellite signal zone could also include the length of the path through the poor satellite signal zone.

The invention claimed is:

1. A method of determining a path taken by a vehicle, comprising:
   receiving satellite signals from a satellite positioning system;
   determining a path portion from a plurality of position estimates of the vehicle using the satellite signals;
   using a database comprising information for a plurality of poor satellite signal zones to determine that the path portion includes a predetermined location of a poor satellite signal zone based on the plurality of position estimates;
   using the predetermined location of the poor satellite signal zone to identify a corresponding predetermined path portion in the database;
   retrieving the predetermined path portion from the database;
   providing the determined path by inserting the predetermined path portion corresponding to the poor satellite signal zone into the path portion; and
   calculating a distance travelled by the vehicle from the determined path.

2. The method of claim 1, wherein determining that the path includes a poor satellite signal zone comprises establishing an error on the positioning estimates and comparing the error to a threshold.

3. The method of claim 2, comprising determining a start of the poor satellite signal zone from a last position estimate of the vehicle where the error does not exceed the threshold before the poor satellite signal, and determining an end of the poor satellite signal zone from a first position estimate of the vehicle where the error does not exceed the threshold after the poor satellite signal zone.

4. The method of claim 1, wherein the predetermined path portion comprises a series of predetermined positions adjusted by accounting for a speed of the vehicle.

5. The method of claim 1, comprising providing the determined path by applying an algorithm to align the path portion and the predetermined path portion.

6. The method of claim 1, wherein at least one poor satellite signal zone is associated with two or more predetermined path portions, the method comprising choosing a corresponding path portion by determining a start of the poor satellite signal zone and an end of the poor satellite signal.

7. The method of claim 1, comprising combining at least one of multiple path portions or multiple predetermined path portions to provide the determined path.

8. The method of claim 1, further comprising calculating a toll charge for the vehicle based on the determined path taken by the vehicle.

9. The method of claim 8, further comprising using the calculated distance travelled by the vehicle to calculate the toll charge.

10. A system for determining a path taken by a vehicle, comprising:
    a database comprising information for a plurality of poor satellite signal zones;
    a receiver for receiving satellite signals from a satellite positioning system; and
    one or more processors arranged to:
      determine a path portion from a plurality of position estimates of the vehicle using said satellite signals;
      use the database to determine that the path portion includes a predetermined location of a poor satellite signal zone based on the plurality of position estimates;
      use the predetermined location of the poor satellite signal zone to identify a corresponding predetermined path portion in the database;
      retrieve the predetermined path portion from the database;
      provide the determined path by inserting the predetermined path portion corresponding to the poor satellite signal zone into the path portion; and
      calculate a distance travelled by the vehicle from the determined path.

11. The system of claim 10, wherein at least one of the processors is located in a remote system, and the vehicle is arranged to transmit data to the remote system.

12. The system of claim 11, wherein the remote system is arranged to determine the poor satellite signal zone.

13. The system of claim 10, comprising a payment system configured to calculate at least one of a toll for the determined path or length of the determined path.

14. The system of claim 13, arranged such that the payment system receives information on, at least one of the determined path, the length of the determined path, or identification information of the vehicle which travelled along the determined path.

15. A vehicle configured to determine a path the vehicle has taken, comprising:
    a receiver for receiving satellite signals from a satellite positioning system;
    a database comprising information for a plurality of poor satellite signal zones; and
    one or more processors arranged to:
      determine a path portion from a plurality of position estimates of the vehicle using said satellite signals;
      use the database to determine that the path portion includes a predetermined location of a poor satellite signal zone based on the plurality of position estimates;
      use the predetermined location of the poor satellite signal zone to identify a corresponding predetermined path portion in the database;
      retrieve the predetermined path portion corresponding to the poor satellite signal zone from the database;
      provide the determined path by inserting the predetermined path portion corresponding to the poor satellite signal zone into the path portion; and
      calculate a distance travelled by the vehicle from the determined path.

* * * * *